No. 774,473. PATENTED NOV. 8, 1904.
H. A. HOUSEMAN.
CIRCULAR KNITTING MACHINE.
APPLICATION FILED JUNE 4, 1903.
NO MODEL. 6 SHEETS—SHEET 1.

WITNESSES:
W. W. Canby
W. B. Marks

INVENTOR
Harry A. Houseman
BY
Harding & Harding
ATTORNEYS

No. 774,473. PATENTED NOV. 8, 1904.
H. A. HOUSEMAN.
CIRCULAR KNITTING MACHINE.
APPLICATION FILED JUNE 4, 1903.
NO MODEL. 6 SHEETS—SHEET 2.

WITNESSES:
H. W. Canby
W. B. Marks

INVENTOR
Harry A. Houseman
BY
Harding & Harding
ATTORNEYS

No. 774,473. PATENTED NOV. 8, 1904.
H. A. HOUSEMAN.
CIRCULAR KNITTING MACHINE.
APPLICATION FILED JUNE 4, 1903.
NO MODEL. 6 SHEETS—SHEET 3.

WITNESSES:
W. W. Canby
W. B. Marks

INVENTOR
Harry A. Houseman
BY
Harding & Harding
ATTORNEYS

No. 774,473. PATENTED NOV. 8, 1904.
H. A. HOUSEMAN.
CIRCULAR KNITTING MACHINE.
APPLICATION FILED JUNE 4, 1903.
NO MODEL. 6 SHEETS—SHEET 4.

WITNESSES:
INVENTOR

No. 774,473. PATENTED NOV. 8, 1904.
H. A. HOUSEMAN.
CIRCULAR KNITTING MACHINE.
APPLICATION FILED JUNE 4, 1903.
NO MODEL. 6 SHEETS—SHEET 5.

WITNESSES:
W. W. Canby
W. B. Marks

INVENTOR
Harry A. Houseman
BY
Harding & Harding
ATTORNEYS

No. 774,473. PATENTED NOV. 8, 1904.
H. A. HOUSEMAN.
CIRCULAR KNITTING MACHINE.
APPLICATION FILED JUNE 4, 1903.
NO MODEL. 6 SHEETS—SHEET 6.
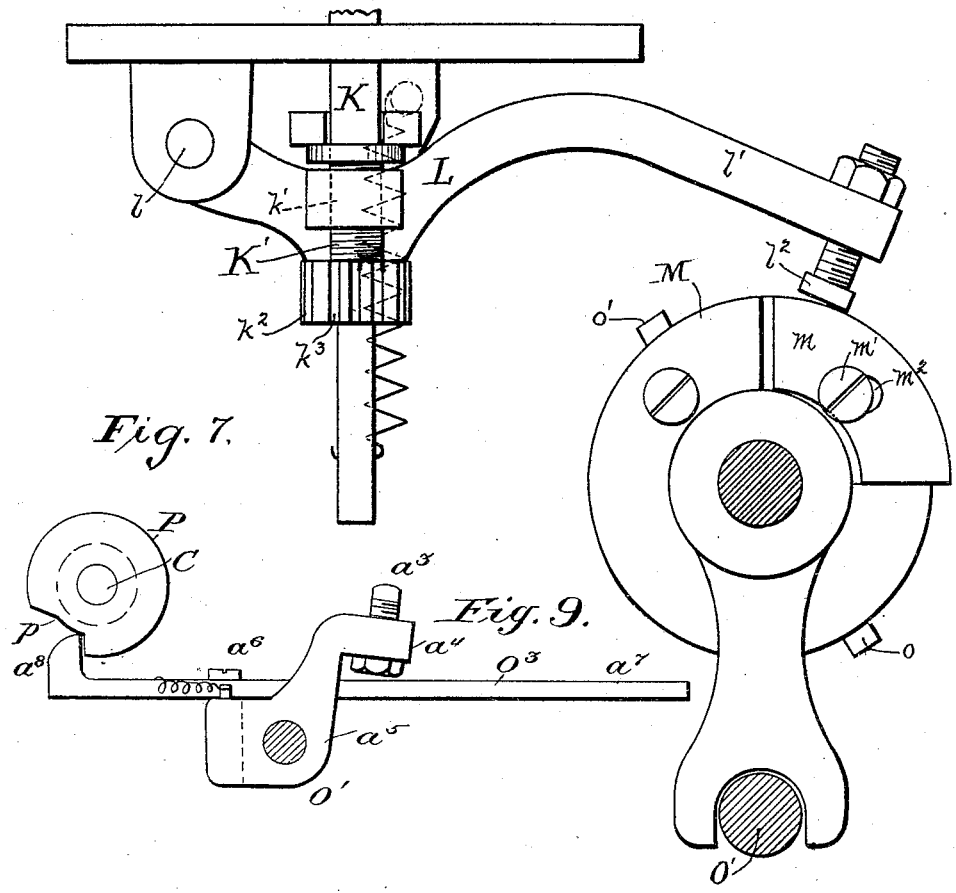
Fig. 7.
Fig. 9.
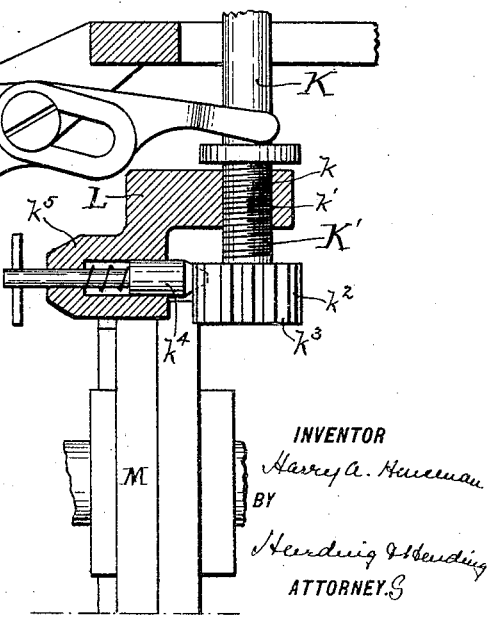
Fig. 8.
WITNESSES:
W. H. Canby
W. B. Marks
INVENTOR
Harry A. Houseman
BY
Herding & Herding
ATTORNEYS No. 774,473.

Patented November 8, 1904.

UNITED STATES PATENT OFFICE.

HARRY A. HOUSEMAN, OF PHILADELPHIA, PENNSYLVANIA, ASSIGNOR TO STANDARD MACHINE COMPANY, OF PHILADELPHIA, PENNSYLVANIA, A CORPORATION OF PENNSYLVANIA.

CIRCULAR-KNITTING MACHINE.

SPECIFICATION forming part of Letters Patent No. 774,473, dated November 8, 1904.

Application filed June 4, 1903. Serial No. 159,996. (No model.)

*To all whom it may concern:*

Be it known that I, HARRY A. HOUSEMAN, a citizen of the United States, residing at Philadelphia, county of Philadelphia, and State of Pennsylvania, have invented a new and useful Improvement in Circular-Knitting Machines, of which the following is a full, clear, and exact description, reference being had to the accompanying drawings, which form a part of this specification.

My invention has for its object certain improvements in the construction and operation of circular-knitting machines.

I will first describe the embodiment of my invention illustrated in the accompanying drawings and then point out the invention in the claims.

Figure 1:
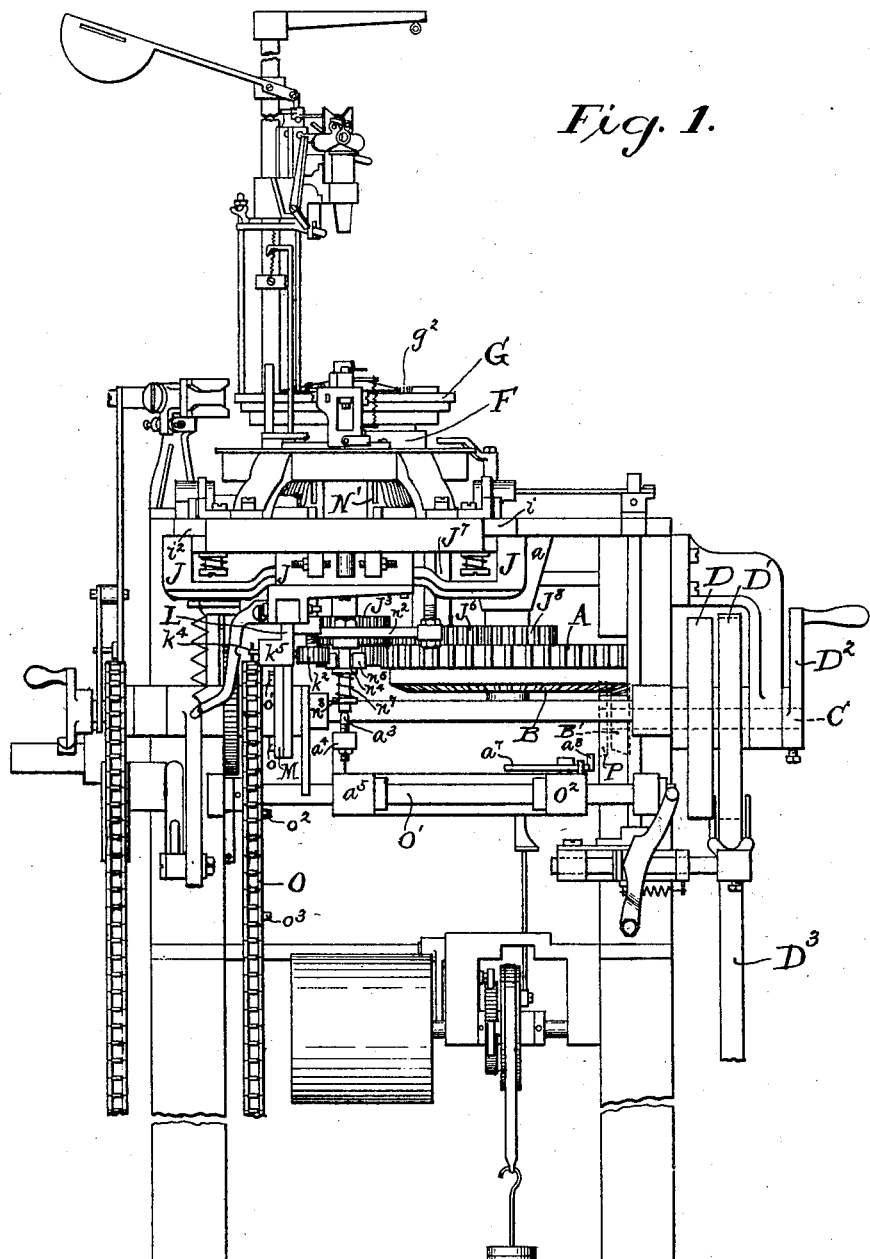
Figure 2:
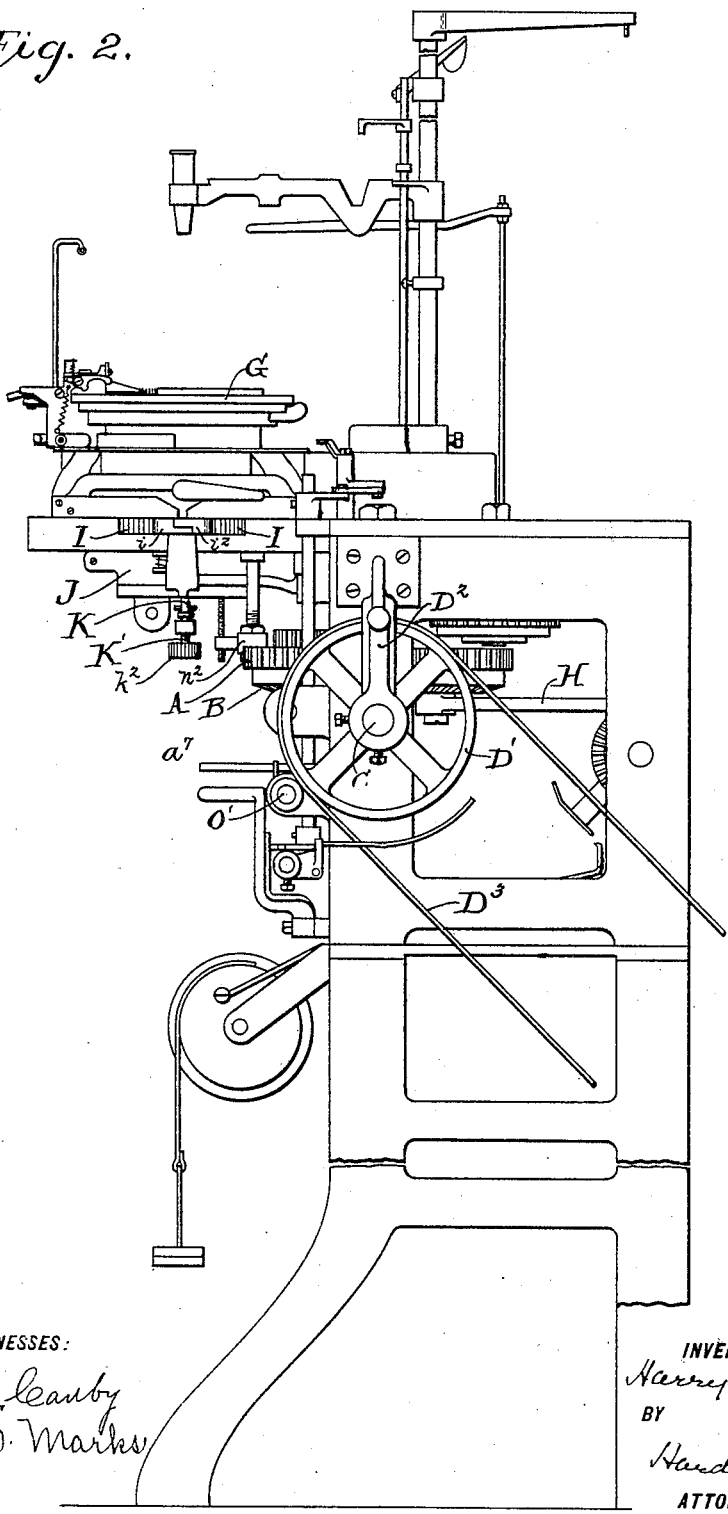
Figure 3:
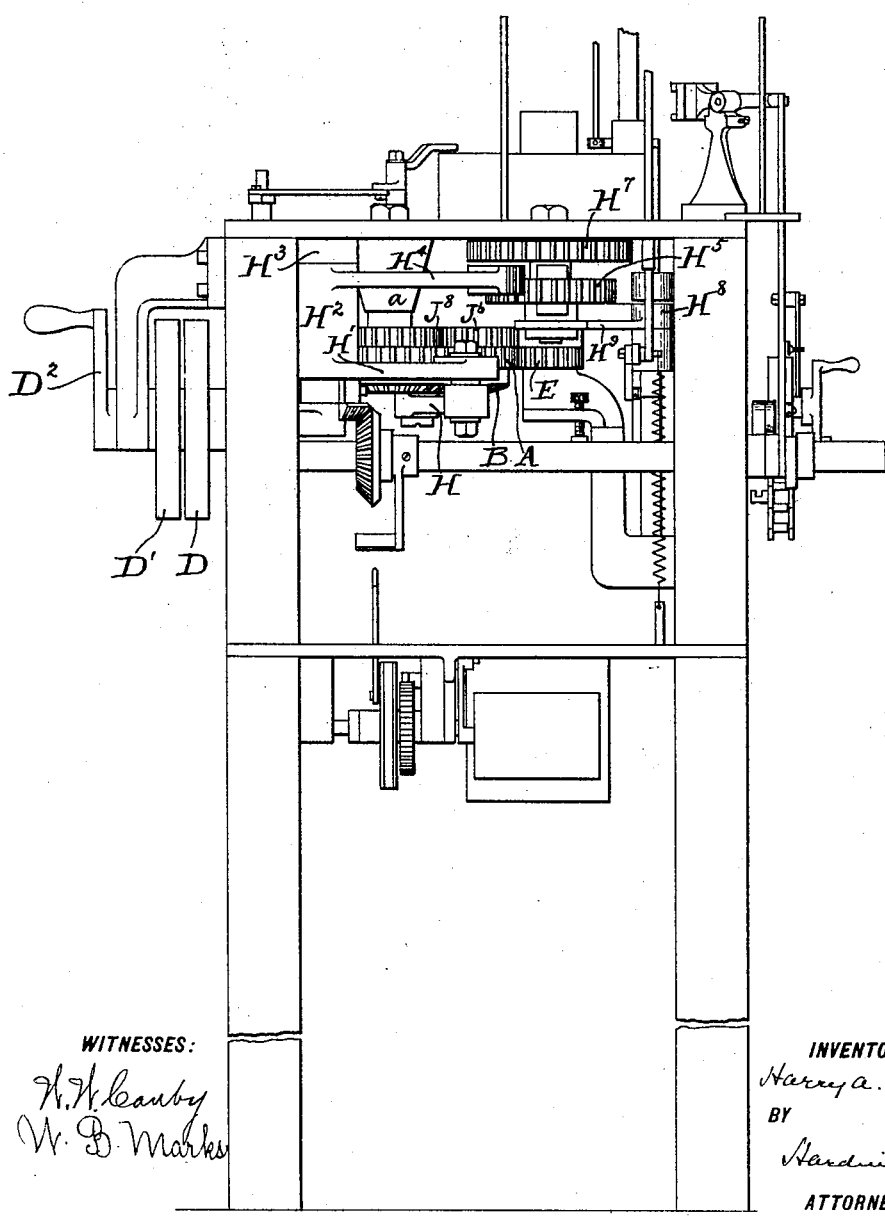
Figure 4:
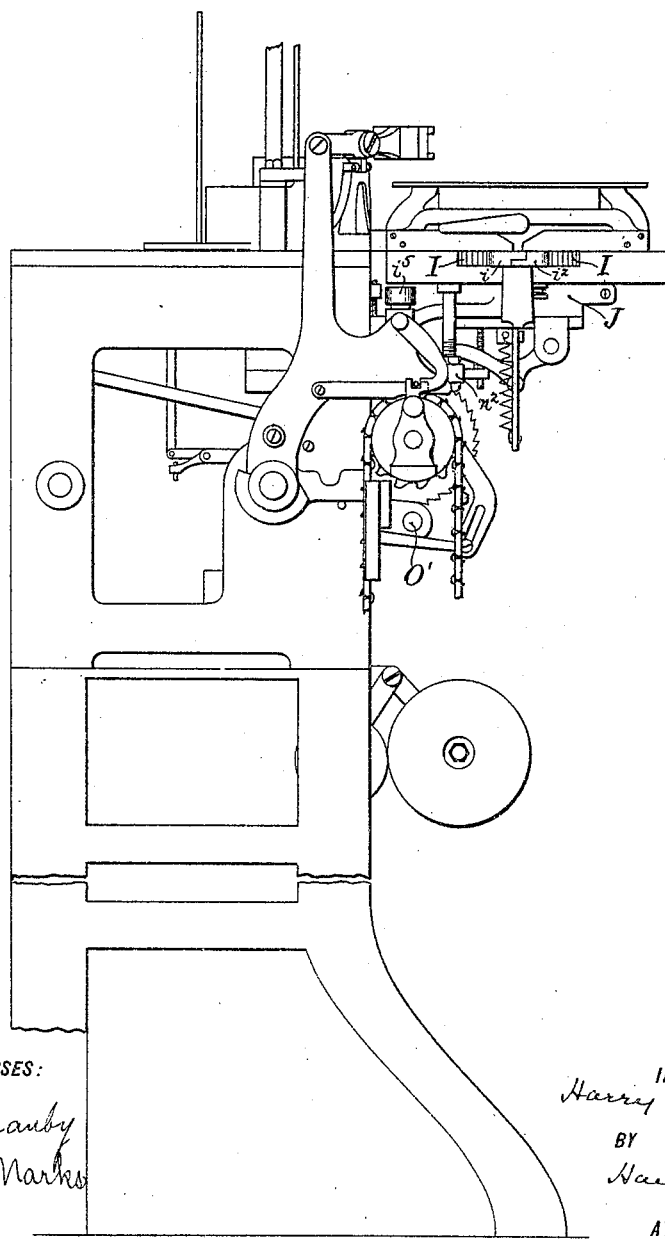
Figure 5:
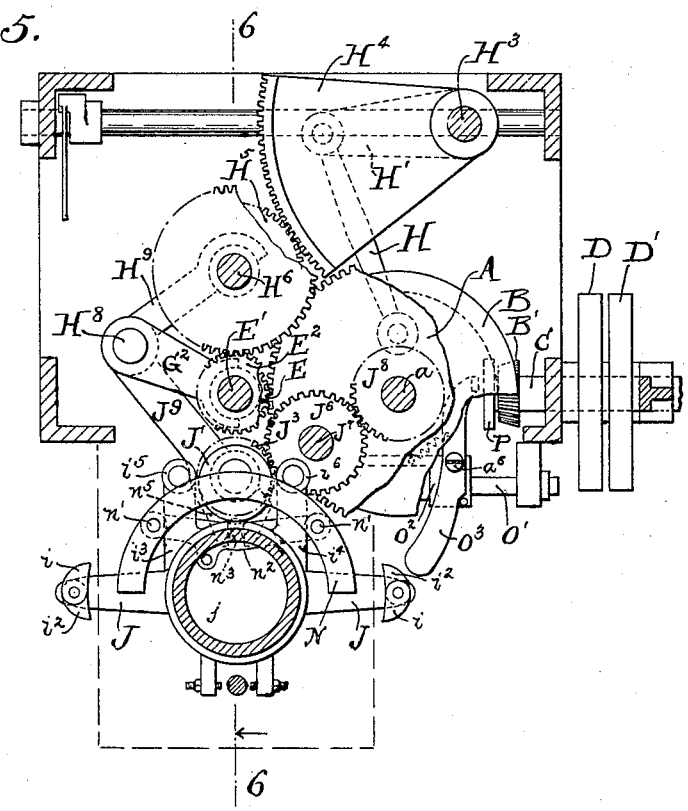
Figure 6:
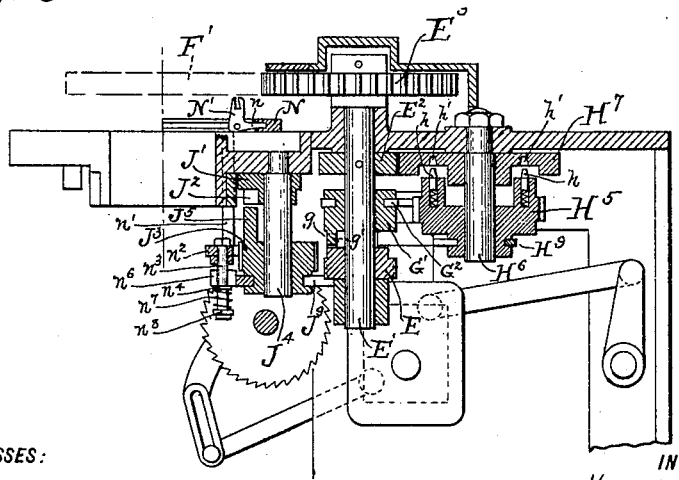

In the drawings, Figure 1 is a front elevation of my machine. Fig. 2 is a side elevation. Fig. 3 is a rear elevation with the top structure broken away. Fig. 4 is a side elevation, top also broken away. Fig. 5 is a sectional plan. Fig. 6 is a sectional elevation on line 6 6, Fig. 5. Fig. 7 is an enlarged detail. Fig. 8 is an enlarged detail at right angles to Fig. 7 and is partly in section. Fig. 9 is an enlarged detail.

A is the main driving-gear of the machine. As shown in the drawings, this gear A is driven in the following manner: Connected with or formed upon one face of the gear A is the bevel-gear B, meshing with the bevel-gear B' upon the shaft C. Upon this shaft is the fixed pulley D and the idle pulley D' and the crank $D^2$. $D^3$ is the driving-belt. The gear A is supported upon the stud $a$. The gear A meshes with the gear E, loose upon the shaft E'. Fixed upon this shaft E' is the gear $E^2$ and the gear $E^3$, the gear $E^3$ meshing with the gear F' upon the cam-cylinder F. G is the needle-cylinder. G' is a clutch feathered upon the shaft E'. H is a crank-rod secured to under face of the gear A and connected to a crank H', connected to one end of the sleeve $H^2$ upon the stud $H^3$, the segmental gear $H^4$ being connected to the other end of said sleeve. This segmental gear meshes with the gear $H^5$ loose upon the stud $H^6$. Loose upon this stud $H^6$ is the gear $H^7$, which meshes with the gear $E^2$. The clutch G' is provided with the lug $g$, which when the clutch is shifted into engagement with gear E alines with projection $g'$ upon the gear E, and thus the gear E is brought into engagement with shaft E', and through the medium of gear $E^3$ the cam-cylinder is rotated. The gear $H^5$ is provided on its face with the spring-pins $h$ $h$ and when moved into engagement with the gear $H^7$ the pins enter orifices $h'$ $h'$ in the face of gear $H^7$, the length of the teeth of segmental gear $H^4$ being sufficient to allow for such throw. When the clutch-pins $h$ $h$ enter the orifices $h'$ $h'$, the gear $H^7$ is reciprocated, and through its connection with the gear $E^3$ the cam-cylinder is reciprocated. The movement of the clutch G' and clutch-pins $h$ $h$ for engagement and disengagement with their respective gears are with respect to each other in opposite directions and being interconnected, as hereinafter described, the gear $E^3$ cannot at any time be in engagement both with the rotary gear E' and the reciprocating gear $H^5$. $G^2$ is a clutch-lever connected to clutch G', and $H^9$ is a clutch-lever connected to the gear $H^5$. These two clutch-levers are connected to a common clutch-rod $H^8$. The mechanism for operating this clutch-rod so as to shift the clutches to bring the gear $E^3$ under the influence of the rotary and reciprocatory motion at the proper times which I use is that shown and described in Letters Patent issued to me April 30, 1895, No. 538,518, and therefore need not here be described in detail.

The needles $g^2$ are supported in levers N' and operated by cams, as shown and described in my Letters Patent No. 538,518, just spoken of. For fashioning I also use, as in that patent is shown and described, fashioning rackplates I, which are operated upon by the pawls $i$ $i^2$ to throw the fashioning-needles in and out of action, the operation being that described in my Patent No. 484,738, dated October 18, 1892. I, however, in my present machine operate these pawls in a manner different from that of my previous-mentioned patent. The pawls $i$ $i^2$ are pivoted at each end of a lever J, which lever is centrally broadened and encircles a bushing $j$, in which the needle-cylinder G is held and upon which needle-cylinder bushing it is adapted to rock.

$i^3$ $i^4$ are arms projecting from the central portion of lever J, having the rollers $i^5$ $i^6$, which rest against the face of an eccentric cam-roller J'. This eccentric cam-roller J' has the projecting piece $J^2$.

$J^3$ is a gear loose upon the shaft $J^4$ and having the projecting piece $J^5$, which when the gear $J^3$ is elevated is in line with projection $J^2$ and revolves the cam-roller J', the cam-roller being idle when the gear is depressed. The gear $J^3$ has long teeth and meshes with the gear $J^6$, supported in the bearing $J^7$ from the frame of the machine. The gear $J^6$ meshes with the gear $J^8$, connected or formed upon the hub of the gear A. A clutch-lever $J^9$, connected to clutch-rod $H^8$, encircles a projection from gear $J^3$, and it is so arranged that when the rod $H^8$ is moved to connect the gears $H^5$ and $H^7$ the gear $J^3$ is elevated, so that projection $J^5$ is in line with projection $J^2$, and when the rod $H^8$ is moved to connect clutch G', so as to connect gear E with shaft E', said gear $J^3$ is depressed, so that projection $J^5$ is out of line with projection $J^2$. This gear $J^3$ is driven independently of the cam-cylinder, and its driving-gears are so arranged that in operation or connection with the cam-roller J' the cam-roller is driven at a different rate of speed from the cam-cylinder and so that the eccentric cam strikes the rollers $j^5$ $j^6$ alternately at each end of a movement in each direction of the cam-cylinder in reciprocation.

From what has been described it may be seen that in my machine practically all of the movements are derived directly from the main gear A. Thus the rotary movement is directly derived from it, and in like manner the reciprocating movement and the movement for operating the rack-plate for the needles in fashioning are derived directly from this one gear, the remaining gears being merely trains for transmission to the desired point of operation. I have thus brought a machine of this type to a most simple and certain construction and operation.

I have also embodied in this machine novel mechanism for varying the length of the stitch and fashioning the leg of the stocking. The needle-cylinder is supported on the rod K. The rod K is supported by the rod K', which is threaded at $k$ and passes through a threaded orifice $k'$ in the lever L. Upon the rod below the lever L is the head of screw $k^2$, having the serrations $k^3$. A spring-acted pin $k^4$, passing through a projection $k^5$ from lever L, may be brought in and out of engagement with the serrations $k^3$. By turning the head $k^2$ the needle-cylinder is elevated or depressed and the length of the stitch may be varied, and by the pin $k^4$ the head $k^2$ may be held in fixed position. The lever L is pivoted at $l$ and the projecting portion $l'$ has the follower $l^2$ resting upon the periphery of cam-roller M. A quadrant of this cam-roller M is partially cut away and there is inserted a portion $m$ eccentric with the remainder of the cam-roller. This piece or portion $m$ is secured by the screw $m'$ working in the slot $m^2$. By moving this portion $m$ in and out in the slot the eccentricity may be varied. (See Fig. 7.) In order, however, to prevent a ledge being formed at the point of juncture of the inserted portion with the remainder of the cam-roller M at the point where in the rotation of the cam-roller M the follower $l^2$ passes this point, I form the slot in a line at right angles to a line drawn from this point to the center of the cam-roller, and thus with any outward or inward movement of the pin $m'$ the juncture of the main portion of cam-roller M and the portion $m$ are at the same level. The follower $l^2$ is made of such width as to cover both the portion $m$ and the main portion of the cam-roller at the point where the eccentric quadrant is inserted. Upon the face of the cam-roller M are two lugs $o$ and $o'$.

O is a pattern-chain, having at the proper points the lugs $o^2$ and $o^3$. When the lug $o^2$ strikes the lug $o$, it moves the cam-roller M one-half turn, bringing the follower $l^2$ under the action of the eccentric portion M, operating the lever L and elevating the rod K and the needle-cylinder. This occurs during the fashioning of the leg. The lug $o^2$ is arranged to strike the lug $o$ when the entire leg is formed, and this moves the cam-roller M another half-turn, bringing the follower off the high portion of eccentric portion $m$ of cam-roller and depressing the follower $l$, lever L, and needle-cylinder. By arranging the pitch of the portion $m$ I can arrange for the desired rate of lengthening the stitch, and by adjusting said portion upon the roller M, I can adjust the desired extent of such fashioning.

I have also provided upon this machine mechanism for bringing the needles to a common level for the purpose of transferring, which I will now describe. As in my patent No. 484,738, hereinbefore spoken of, in my present machine at the commencement of formation of heel and toe one-half of the needles are thrown out of action and remain out of action until the completion of the heel and toe. These needles last spoken of are held in levers N', having long tailpieces $n$, which rest in a groove in a plate N. This plate has the pins $n'$ $n'$ connected together by the cross-bar $n^2$. Projecting from the cross-bar $n^2$ is the rod $n^3$. Surrounding this rod $n^3$, between the cross-bar $n^2$ and a loose washer $n^4$, is the forked end $n^6$ of a projection $n^5$ from the clutch-lever $J^9$, so that whenever the clutch-lever $J^9$ is operated to elevate gear $J^3$ the cross-bar $n^2$ and plate N are elevated, throwing half the needles out of action, and when gear $J^3$ is depressed the lever $J^9$ is depressed which by reason of a spring $n^7$, confined between the washer $n^4$ and the enlarged end $n^8$ of rod $n^3$, depresses the plate N, bringing these needles again in action, and as this last-mentioned movement of gear $J^3$ takes place at the end of the formation of the heel or toe the return of the needles into action takes place at that time. To this mechanism I add the following: Beneath the lower end of rod $n^3$ rests the end of rod $a^3$, which rod is threaded and passes through a threaded projection $a^4$ from the rocking frame $a^5$, mounted upon the shaft O'. Projecting from the other end of the rocking frame is the arm $O^2$. Pivotally mounted upon this arm $O^2$ at $a^6$ is the lever $O^3$, having at one end the handle or projecting portion $a^7$ and at the other end the cam $a^8$. Upon the shaft C is the roller P, having the cut-away portion $p$ with inclined walls. This cut-away portion $p$ is so arranged that in the revolution of the roller P it comes opposite the line of movement of cam $a^8$, when lever $O^3$ is swung upon its pivot when the cam-cylinder is operating upon the needles which are uninfluenced by the plate N. If at any time it is desired to transfer and thus to bring the needles to a common level all out of influence of the knitting-cams, the lever $O^3$ is swung on its pivot and the cam $a^8$ brought into the cut-away portion $p$ of roller P. This can, as before described, be done only at a point where the knitting-cam is operating upon those needles uninfluenced by plate N, so there is no danger in the subsequent action of plate N of breaking or affecting any needles. When the cam $a^8$ enters the portion $p$ of roller P, the further revolution of the roller carries it up the incline to the high face of the roller P, rocking the frame O and lifting the rod $n^3$ against the action of spring $n^7$, lifting the plate N and throwing half the needles out of action. The continued movement of the shaft C brings the knitting-cam around to the part of the machine where the needles have been thrown out of action, and the cam has no effect upon them. At this point the machine is stopped and the needles being all out of the influence of the knitting-cams are at the same level. When the transfer has been made, the further revolution of shaft C brings the cut-away portion $p$ opposite the cam end $a^8$ of lever $O^3$ and the lever may be swung on its pivot, releasing the cam $a^8$ from the influence of the roller P and the ordinary knitting may then be proceeded with.

The cam-cylinder, as before described, is rotated by means of the gear E on the shaft E'. The gear E is driven by the gear A, which in turn is driven by the gear B' on shaft C. The gear E' therefore rotates in unison with shaft C, on which shaft is the roller P. Hence the roller P and gear E (and thus the cam-cylinder) rotate in unison.

I do not herein claim the gearing for rotating and reciprocating the cam-cylinder hereinbefore described, as the same forms the subject-matter of a divisional application filed by me July 17, 1903, Serial No. 165,973.

Having now fully described my invention, what I claim, and desire to protect by Letters Patent, is—

1. In combination, with the cam-cylinder and means to reciprocate said cam-cylinder, fashioning rack-plates, pawls for operating said plates, controlling-levers for said pawls, a device for operating said levers and means to give said device a different speed movement than that of the cam-cylinder in reciprocation.

2. In combination, a cam-cylinder, a main driving mechanism connection between said driving mechanism and the cam-cylinder, fashioning rack-plates, pawls for operating said plates, levers for controlling said pawls adapted to reciprocate said cam-cylinder, a device for operating said levers and connection between said main driving mechanism and said device independent of the cam-cylinder connection.

3. In combination, a cam-cylinder, a main driving mechanism, connection between said driving mechanism and the cam-cylinder, adapted to reciprocate said cam-cylinder, fashioning rack-plates, pawls for operating said plates, levers for controlling said pawls, an eccentric cam-roller adapted to operate upon said levers, and connection between said driving mechanism and cam-roller, independent of the cam-cylinder connection, adapted to rotate said cam-roller.

4. In combination, a cam-cylinder, a main driving mechanism, connection between said driving mechanism and the cam-cylinder, adapted to reciprocate said cam-cylinder, fashioning rack-plates, pawls for operating the same, levers for controlling said pawls, an eccentric cam-roller adapted to operate said levers, a shaft upon which said cam-roller is mounted, a gear upon said shaft, connection between said gear and the main driving mechanism independent of the cam-cylinder, and means to bring said gear into and out of driving connection with said cam-roller.

5. In combination, a cam-cylinder, a main driving mechanism, connection between said driving mechanism and the cam-cylinder adapted to reciprocate said cam-cylinder, fashioning rack-plates, pawls for operating the same, levers for controlling said pawls, an eccentric cam-roller adapted to operate said levers, a shaft upon which said cam-roller is mounted, a gear loose upon said shaft, driving connection between the driving mechanism and said gear independent of the cam-cylinder connection, and means to move said gear into and out of engagement with said cam-roller.

6. In combination, a cam-cylinder, a main driving mechanism, connection between said driving mechanism and the cam-cylinder adapted to rotate said cam-cylinder, connection between said driving mechanism and the cam-cylinder adapted to reciprocate said cam-cylinder, controlling mechanism for determining whether the cam-cylinder is driven by the reciprocating or rotating means, fashioning rack-plates, pawls for operating the same, levers for controlling said pawls, a device for operating said levers, and connection, normally inactive, between said main driving mechanism and said device, independent of the cam-cylinder connections and means to render said pawl-lever-operating device effective when the cam-cylinder is driven by the reciprocating means.

7. In combination, a cam-cylinder, a main driving mechanism, connection between said driving mechanism and the cam-cylinder adapted to rotate said cam-cylinder, connection between said driving mechanism and the cam-cylinder adapted to reciprocate said cam-cylinder-controlling mechanism for determining whether the cam-cylinder is driven by the reciprocating or rotating means, fashioning rack-plates, pawls for operating the same, levers for controlling said pawls, a cam-roller for operating said levers, a shaft upon which said cam-roller is mounted, a gear upon said shaft, driving connections, and connection between the cam-cylinder-controlling mechanism and the gear upon the shaft, adapted to bring said gear into driving engagement with said cam-roller when the cam-cylinder-reciprocating means is brought into action and to release said driving engagement when the cam-cylinder rotary means is brought into action.

8. In combination, a cam-cylinder, a main driving mechanism, connection between said driving mechanism and the cam-cylinder adapted to rotate said cam-cylinder, connection between said driving mechanism and the cam-cylinder adapted to reciprocate said cam-cylinder-controlling mechanism for determining whether the cam-cylinder is driven by the reciprocating or rotating means, fashioning rack-plates, pawls for operating the same, levers for controlling said pawls, a cam-roller for operating said levers, a shaft upon which said cam-roller is mounted, a gear loose upon said shaft, driving connections, and connection between the cam-cylinder-controlling mechanism and the gear upon the shaft, adapted to bring said gear into driving engagement with said cam-roller when the cam-cylinder-reciprocating means is brought into action and to release said driving engagement when the cam-cylinder rotary means is brought into action.

9. In a circular-knitting machine, a roller having a portion partially cut away, a piece inserted therein eccentric with the remainder of the roller and movable in a line at right angles to a line from the point of juncture of one end of the inserted piece and the main portion of the roller, at the periphery, to the center of the main roller.

10. In a circular-knitting machine, a roller having a portion cut away, a piece inserted therein eccentric with the remainder of the roller and movable in a line at right angles to a line from the joint of juncture of one end of the inserted piece and the main portion of the roller, at the periphery, to the center of the main roller.

11. In a circular-knitting machine, a roller having a portion thereof partially cut away, a piece inserted therein eccentric with the remainder of the roller, a slot-and-pin connection between the inserted piece and the main portion of the roller, said slot being at right angles to a line from the point of juncture of one end of the inserted piece with the main portion of the roller, at the periphery, to the center.

12. In a circular-knitting machine, in combination, a needle-cylinder, a vertically-movable rod upon which said cylinder is supported, a lever to which said rod is connected so as to be moved by said lever, a roller having a portion thereof partially cut away, a piece inserted therein eccentric to the remainder of the roller, said lever contacting with said roller and means to rotate said roller.

13. In a circular-knitting machine, in combination, a needle-cylinder, a vertically-movable rod upon which said cylinder is supported, a lever to which said rod is connected so as to be moved by said lever, a roller having a portion thereof cut away, a piece inserted therein eccentric to the remainder of the roller, said lever contacting with said roller and means to rotate said roller.

14. In a circular-knitting machine, in combination, a needle-cylinder, a vertically-movable rod upon which said cylinder is supported, a lever to which said rod is connected, said lever having a follower, a roller having a portion thereof partially cut away, a piece inserted therein eccentric to the remainder of the roller, said lever-roller contacting with said roller having a portion cut away and means to rotate said last-mentioned roller.

15. In a circular-knitting machine, in combination, a needle-cylinder, a vertically-movable rod upon which said cylinder is supported, a lever to which said rod is connected, said lever having a follower, a roller having a portion thereof cut away, a piece inserted therein eccentric to the remainder of the roller, said lever-follower having a portion cut away and means to rotate said last-mentioned roller.

16. In a circular-knitting machine, in combination a needle-cylinder, a vertically-movable rod upon which said cylinder is supported, a lever to which said rod is connected so as to be moved by said lever, a roller having a portion thereof partially cut away, a piece inserted therein eccentric to the remainder of the roller, said lever contacting with said roller, said roller having a lug, a pattern-chain, a lug upon said chain, said roller-lug being in line of travel of said pattern-chain lug and adapted when struck to rotate said roller.

17. In a circular-knitting machine, in combination, a needle-cylinder, a vertically-movable rod upon which said cylinder is supported, a lever to which said rod is connected so as to be moved by said lever, a roller having a portion thereof partially cut away, a piece inserted therein eccentric to the remainder of the roller, said lever contacting with said roller, lugs upon said roller at different points, lugs upon the pattern-chain, one roller-lug being in line of travel of one pattern-chain lug and adapted when struck to rotate said roller and bring the other roller-lug in line of travel of the other of said pattern-chain lugs and when struck thereby to bring the first-mentioned roller-lug in line with the first-mentioned pattern-chain lug.

18. In a circular-knitting machine, in combination, a needle-cylinder, a vertically-movable rod upon which said cylinder is supported, a lever to which said rod is connected so as to be moved by said lever, a roller having a portion thereof cut away, a piece inserted therein eccentric to the remainder of the roller, said lever contacting with said roller, said roller having a lug, a pattern-chain, a lug upon said chain, said roller-lug being in line of travel of said pattern-chain lug and adapted when struck to rotate said roller.

19. In a circular-knitting machine, in combination, a needle-cylinder, a vertically-movable rod upon which said cylinder is supported, a lever to which said rod is connected so as to be moved by said lever, a roller having a portion thereof cut away, a piece inserted therein eccentric to the remainder of the roller, said lever contacting with said roller, lugs upon said roller at different points, lugs upon the pattern-chain, one roller-lug being in line of travel of one pattern-chain lug and adapted when struck to rotate said roller and bring the other roller-lug in line of travel of the other of said pattern-chain lugs and when struck thereby to bring the first-mentioned roller-lug in line with the first-mentioned pattern-chain lug.

20. In a circular-knitting machine, in combination, a needle-cylinder, supported so as to be vertically movable, a roller having a portion thereof partially cut away, a piece inserted therein eccentric with the remainder of the roller, means to rotate said roller and connection between said roller and the needle-cylinder support.

21. In a circular-knitting machine, in combination, a needle-cylinder, supported so as to be vertically movable, a roller having a portion thereof cut away, a piece inserted therein eccentric with the remainder of the roller, means to rotate said roller and connection between said roller and the needle-cylinder support.

22. In a circular-knitting machine, in combination, a needle-cylinder, supported so as to be vertically movable, a roller having a portion thereof cut away, a piece inserted therein eccentric with the remainder of the roller and adjustable thereon, means to rotate said roller and connection between said roller and the needle-cylinder support.

23. In a circular-knitting machine, in combination, a needle-cylinder, supported so as to be vertically movable, a roller having a portion thereof cut away, a piece inserted therein eccentric with the remainder of the roller and adjustable thereon in a line at right angles to a line from the juncture of the inserted piece and main portion of the roller at the periphery to the center, means to rotate said roller and connection between said roller and the needle-cylinder support.

24. In a circular-knitting machine, in combination, a needle-cylinder, a vertically-movable rod upon which said cylinder is supported, a lever to which said rod is connected so as to be moved by said lever, a roller having a portion thereof cut away, a piece inserted therein eccentric to the remainder of the roller and adjustable thereon, said lever contacting with said roller and means to rotate said roller.

25. In a circular-knitting machine, in combination, a needle-cylinder, a vertically-movable rod upon which said cylinder is supported, a lever to which said rod is connected, said lever having a follower, a roller having a portion thereof cut away, a piece inserted therein eccentric to the remainder of the roller and adjustable thereon, said lever-roller contacting with said roller having a portion cut away and means to rotate said last-mentioned roller.

26. In a circular-knitting machine of the character described, in combination, a needle-cylinder, needles therein, a plate carrying certain of the needles, a movable support for said plate, a roller having a cam-surface at one portion thereof, operating connection between said roller and support, normally out of connection with the roller, and means whereby said operating connection may be brought into and out of contact with the roller.

27. In a circular-knitting machine of the character described, in combination, a needle-cylinder, needles therein, a plate carrying certain of the needles, a movable support for said plate, a roller having a cam-surface at one portion thereof, operating connection between said roller and support, normally out of connection with the roller, and means whereby said operating connection may be brought into and out of contact with the roller, at the cam portion of said roller.

28. In a circular-knitting machine of the character described, in combination, a cam-cylinder and knitting-cams, a needle-cylinder and needles therein, a plate carrying certain of the needles, a movable support for said plate, a roller having a cam-surface at one portion thereof, means to rotate said roller in relation to the cam-cylinder, operating mechanism for said plate-support, said cam-surface of the roller being adjusted to be opposite to said operating mechanism when the knitting-cams are operating on the needles unsupported by the plate, and means whereby said operating mechanism may be brought into operative connection with the cam portion of said roller.

29. In a circular-knitting machine of the character described, in combination, a cam-cylinder, a needle-cylinder and needles therein, a plate carrying certain of the needles, a movable support for said plate, a roller having a cam-surface at one portion thereof, operating mechanism between said roller and plate-support, means to rotate said cam-cylinder, means to rotate said roller in unison with the rotation of the cam-cylinder; the cam portion of said roller being at a portion of said roller to act upon the operating mechanism when the knitting-cams are acting upon needles uninfluenced by the plate.

30. In a circular-knitting machine of the character described, in combination, a needle-cylinder, needles therein, a plate carrying certain of the needles, a movable support for said plate, a rocking frame for operating said support, an arm projecting from said frame, a roller having a cam portion, means whereby said arm may be brought into and out of contact with said roller.

31. In a circular-knitting machine of the character described, in combination, a cam-cylinder, a needle-cylinder, needles therein, a plate carrying certain of the needles, a movable support for said plate, a rocking frame for operating said support, an arm projecting from said frame, a roller having a cam portion, means whereby said arm may be brought into and out of contact with the cam portion of said roller, a cam-cylinder, means to rotate said cam-cylinder, means to rotate said roller in unison with the rotation of said cam-cylinder.

32. In a circular-knitting machine of the character described, in combination, a needle-cylinder, needles therein, a plate, carrying certain of the needles, a movable support for said plate, a rocking frame for operating said support, an arm projecting from said frame, a roller having a cam portion, means whereby said arm may be brought into and out of contact with the cam portion of said roller, a cam-cylinder, means to rotate said cam-cylinder, means to rotate said roller in unison with the rotation of said cam-cylinder, the cam portion of said roller being at a portion of said roller to act upon said arm when the knitting-cams are acting upon the needles uninfluenced by said plate.

33. In a circular-knitting machine of the character described, in combination, a needle-cylinder, needles therein, a plate carrying certain of the needles, a movable support for said plate, a rocking frame, a projection from said rocking frame upon which said support rests, an arm projecting from said rocking frame, a lever pivoted upon said arm, a roller having a cut-away portion provided with inclined walls.

34. In a circular-knitting machine of the character described, in combination, a needle-cylinder, needles therein, a plate carrying certain of the needles, a movable support for said plate, a rocking frame, a projection from said rocking frame upon which said support rests, an arm projecting from said rocking frame, a lever pivoted upon said arm, a roller having a cut-away portion provided with inclined walls, a cam-cylinder, means to rotate said cam-cylinder, and means to rotate said roller in unison with the rotation of said cam-cylinder.

35. In a circular-knitting machine of the character described, in combination, a needle-cylinder, needles therein, a plate carrying certain of the needles, a movable support for said plate, a rocking frame, a projection from said rocking frame upon which said support rests, an arm projecting from said rocking frame, a lever pivoted upon said arm, a roller having a cut-away portion provided with inclined walls, a cam-cylinder, means to rotate said cam-cylinder, means to rotate said roller in unison with the rotation of said cam-cylinder, the cut-away portion of said roller being at a portion of said roller to act upon said lever when the knitting-cams are acting upon the needles uninfluenced by said plate.

36. In a circular-knitting machine of the character described, in combination, a needle-cylinder, needles therein, a plate, carrying certain of the needles, a movable support for said plate, a rocking frame, a projection from said rocking frame upon which said support rests, an arm projecting from said rocking frame, a lever pivoted upon said arm, a cam upon said lever, a roller having a cut-away portion provided with inclined walls.

37. In a circular-knitting machine of the character described, in combination, a needle-cylinder, needles therein, a plate carrying certain of the needles, a movable support for said plate, a rocking frame, a projection from said rocking frame upon which said support rests, an arm projecting from said rocking frame, a lever pivoted upon said arm, a cam upon said lever, a roller having a cut-away portion provided with inclined walls, a cam-cylinder, means to rotate said cam-cylinder, means to rotate said roller in unison with the rotation of said cam-cylinder.

38. In a circular-knitting machine of the character described, in combination, a needle-cylinder, needles therein, a plate carrying certain of the needles, a movable support for said plate, a rocking frame, a projection from said rocking frame upon which said support rests, an arm projecting from said rocking frame, a lever pivoted upon said arm, a cam upon said lever, a roller having a cut-away portion provided with inclined walls, a cam-cylinder, means to rotate said cam-cylinder, means to rotate said roller in unison with the rotation of said cam-cylinder, the cut-away portion of said roller being at a portion of said roller to act upon said lever when the knitting-cams are acting upon the needles uninfluenced by said plate.

39. In a circular-knitting machine of the character described, in combination, a needle-cylinder, needles therein, a plate carrying certain of the needles, a movable support for said plate, a rocking frame, a projection from said rocking frame upon which said support rests, an arm projecting from said rocking frame, a lever pivoted upon said arm, a cam at one end of said lever and a handle or projection at the other end thereof, a roller having a cut-away portion provided with inclined walls.

40. In a circular-knitting machine of the character described, in combination, a needle-cylinder, needles therein, a plate carrying certain of the needles, a movable support for said plate, a rocking frame, a projection from said rocking frame upon which said support rests, an arm projecting from said rocking frame, a lever pivoted upon said arm, a cam at one end of said lever and a handle or projection at the other end thereof, a roller having a cut-away portion provided with inclined walls, a cam-cylinder, means to rotate said cam-cylinder, means to rotate said roller in unison with the rotation of said cam-cylinder.

41. In a circular-knitting machine of the character described, in combination, a needle-cylinder, needles therein, a plate carrying certain of the needles, a movable support for said plate, a rocking frame, a projection from said rocking frame upon which said support rests, an arm projecting from said rocking frame, a lever pivoted upon said arm, a cam at one end of said lever and a handle or projection at the other end thereof, a roller having a cut-away portion provided with inclined walls, a cam-cylinder, means to rotate said cam-cylinder, means to rotate said roller in unison with the rotation of said cam-cylinder, the cut-away portion of said roller being at a portion of said roller to act upon said lever when the knitting-cams are acting upon the needles uninfluenced by said plate.

In testimony of which invention I have hereunto set my hand, at Philadelphia, on this 28th day of May, 1903.

HARRY A. HOUSEMAN.

Witnesses:
  M. M. HAMILTON,
  WILLIAM B. MARKS.